United States Patent [19]
Kaite et al.

[11] Patent Number: 4,987,491
[45] Date of Patent: Jan. 22, 1991

[54] JITTER COMPENSATION CIRCUIT FOR PROCESSING JITTER COMPONENTS OF REPRODUCED VIDEO SIGNAL

[75] Inventors: Osamu Kaite, Osaka; Takahiro Yuchi, Hyogo; Hirotsugu Murashima, Nara, all of Japan

[73] Assignee: Sanyo Electric Co., Ltd., Osaka, Japan

[21] Appl. No.: 472,982

[22] Filed: Jan. 12, 1990

[30] Foreign Application Priority Data

Jan. 20, 1989 [JP] Japan ................................. 1-12712
Jul. 4, 1989 [JP] Japan ................................. 1-172461

[51] Int. Cl.$^5$ .......................................... H04N 5/95
[52] U.S. Cl. ................................. 358/166; 358/37; 358/167; 358/324; 358/337; 358/340
[58] Field of Search ............... 358/166, 167, 36, 37, 358/336, 340, 337, 310, 324, 342, 343

[56] References Cited

U.S. PATENT DOCUMENTS

| | | | |
|---|---|---|---|
| 4,613,908 | 9/1986 | Takahashi | 358/310 |
| 4,698,694 | 10/1987 | Tomita | 358/320 |
| 4,805,034 | 2/1989 | Kitamura | 358/320 |
| 4,819,088 | 4/1989 | Higurashi | 358/343 |

FOREIGN PATENT DOCUMENTS

58-124385 7/1983 Japan.

*Primary Examiner*—Tommy P. Chin
*Attorney, Agent, or Firm*—Armstrong, Nikaido, Marmelstein, Kubovcik & Murray

[57] ABSTRACT

A reproduced video signal of a VTR is applied to a jitter compensation circuit (100). The applied reproduced video signal is A/D converted by a phase modulated clock and after subjected to the adjustment of timing, the signal is written into a memory (4). A burst signal period is specified based on a timing of a horizontal synchronizing signal in the reproduced video signal and a jitter amount is detected based on a sampling phase of the A/D converted burst. Jitter compensation data is calculated based on this jitter amount. On this occasion, latest jitter compensation data is obtained based on the detected jitter amount and the jitter compensation data one horizontal period before. A timing for starting to write the A/D converted video data into the memory is defined based on high-order data of the calculated jitter compensation data, thereby cancelling large jitter components. On the other hand, a phase of a A/D converting clock is controlled based on low-order data of the jitter compensation data, thereby cancelling small jitter components.

9 Claims, 9 Drawing Sheets

FIG.3
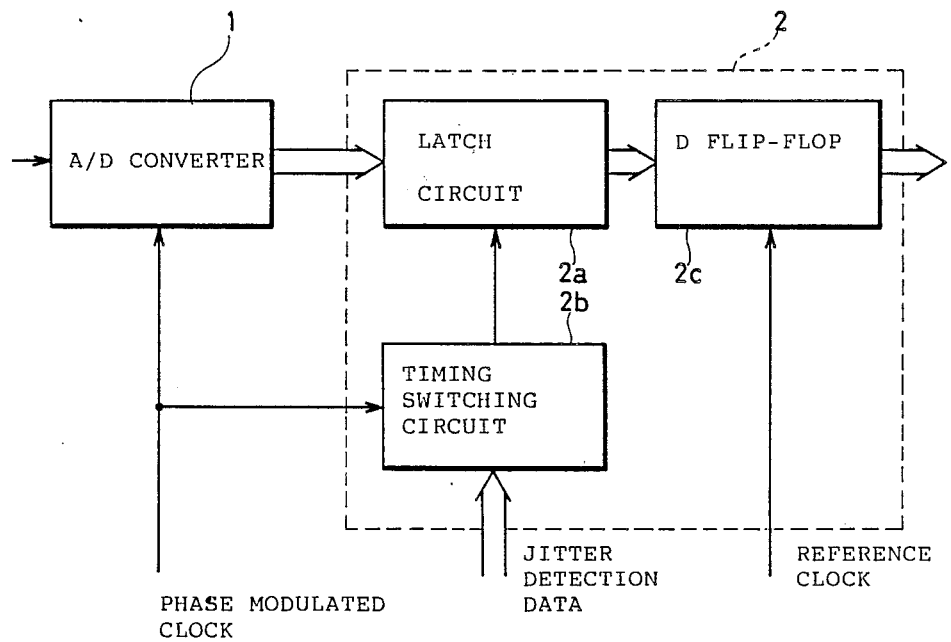
FIG.4A
PRIOR ART
FIG.4B
PRIOR ART
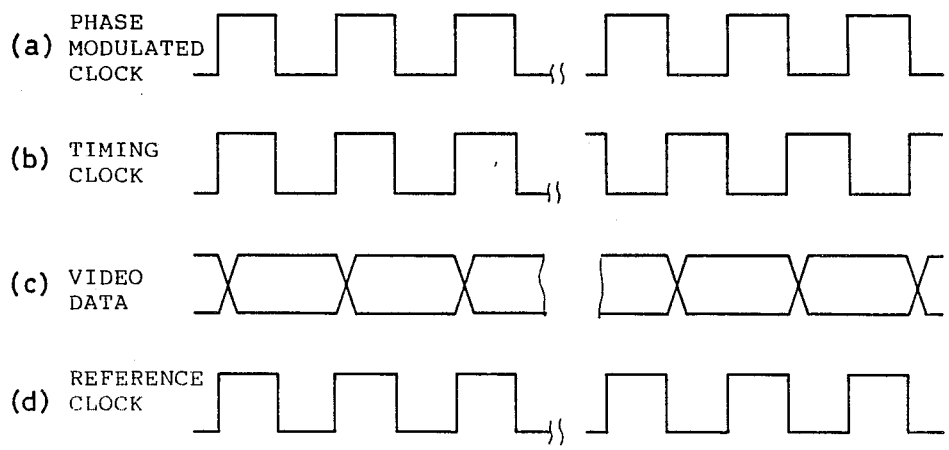
(a) PHASE MODULATED CLOCK
(b) TIMING CLOCK
(c) VIDEO DATA
(d) REFERENCE CLOCK

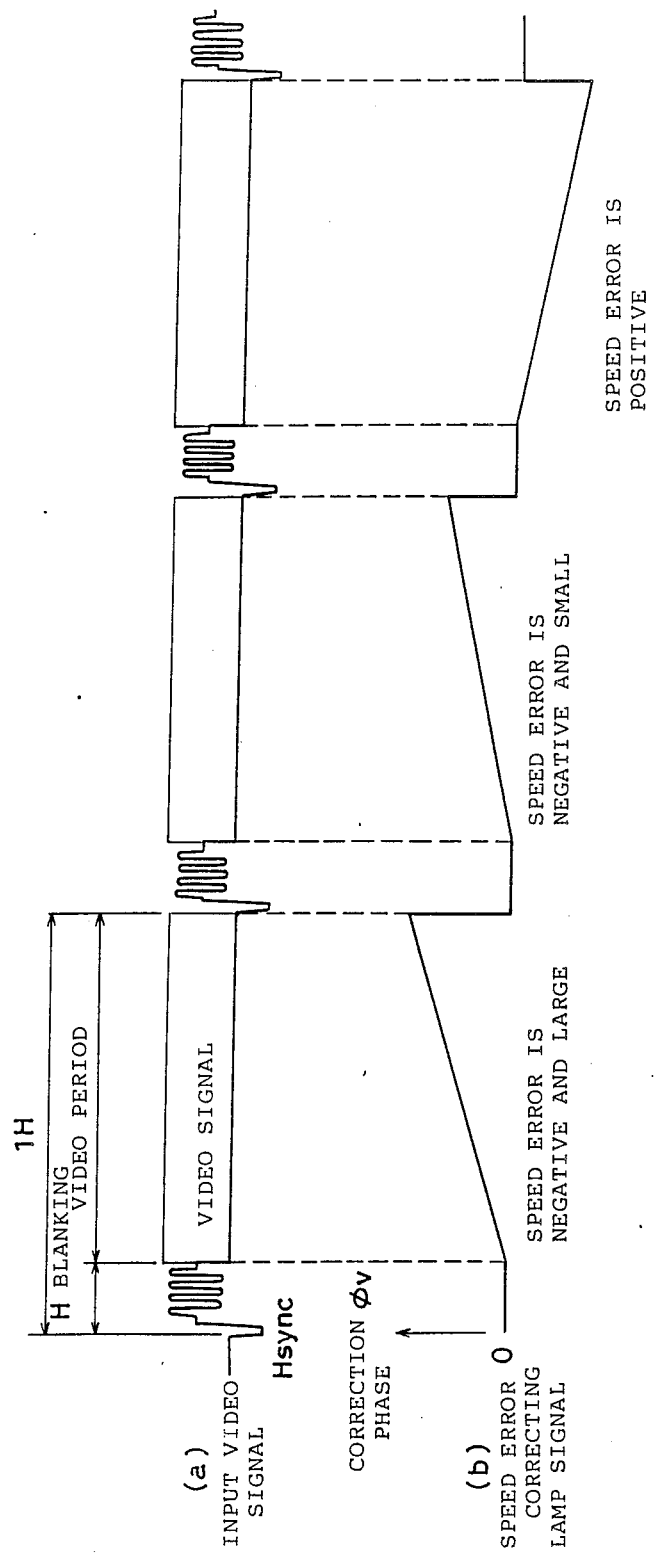

JITTER COMPENSATION CIRCUIT FOR PROCESSING JITTER COMPONENTS OF REPRODUCED VIDEO SIGNAL

BACKGROUND OF THE INVENTION

1. Field of the Invention

The present invention relates generally to jitter compensation circuits, and more particularly, a jitter compensation circuit for processing jitter components included in a video signal, for example, a high definition television (HDTV) signal reproduced by a video signal reproducing apparatus such as a video tape recorder (refered to as VTR hereinafter) and a video disc player.

2. Description of the Background Art

In general, a reproduced video signal outputted from a video signal reproducing apparatus such as a VTR and a video disc player is subjected to fluctuation in time due to various causes. Such fluctuation in time is generally referred to as "jitter". Taking a VTR as an example, jitter components are included in a reproduced video signal due to various causes such as the fluctuation of a tape travelling speed, irregular rotation of a cylinder and the vibration of a tape in traveling at the time of recording and/or reproducing of the video signal to and from the tape. Allowing such jitter components causes flickering of picture and unevenness of color, which deteriorate the picture quality. Therefore, a conventional video signal reproducing apparatus is usually provided with a correction circuit for jitter components. As an example of such a jitter compensation circuit, the circuit adapted for a VTR is disclosed in Japanese Patent Laying-Open No. 58-124385.

FIG 1 is a schematic block diagram showing such a conventional jitter compensation circuit for VTR. In FIG. 1, a jitter compensation circuit 100 built in the VTR itself receives a reproduced video signal from a video signal reproducing circuit 200 of the VTR to subject the same to the jitter compensation which will be described later, then externally outputs the jitter corrected video signal as a reproduced video signal output of the VTR through an external output terminal 300 of the VTR to supply the same to a display device (not shown) such as a monitor TV.

Briefly state, the jitter compensation circuit 100 shown in FIG. 1 corrects jitter components in a reproduced video signal roughly by controlling the timing for starting to write an A/D converted reproduced video information to a memory every horizontal line, and furthermore corrects jitter components finely by controlling the timing for A/D convertng the reproduced video signal. In order to perform such a jitter compensation, first the amount of jitter in the reproduced video signal should be detected. Such detection of the jitter amount is carried out by detecting a phase shift of a burst signal considering that a level of the burst signal in the A/D converted reproduced video signal corresponds to the phase shift of the video signal itself.

FIG. 2 is a timing chart for explaining an operation of the jitter compensation circuit 100 shown in FIG. 1. With reference to FIGS. 1 and 2, a structure and an operation of the conventional jitter compensation circuit will be described in the following.

First, a reproduced video signal applied from the video signal reproducing circuit 200 of FIG. 1 to the jitter compensation circuit 100 is comprised of a negative horizontal synchronizing signal $H_{SYNC}$, a burst signal and a video signal (including time base compressed color signal C and luminance signal Y) in one horizontal (H) period as shown in FIG. 2 (a), wherein the horizontal synchronizing signal and the burst singla are included in a horizontal blanking period.

The reproduced video signal is first applied to an A/D converter 7 wherein the signal is A/D converted in synchronization with a reference clock supplied from a reference clock generating circuit 17. Then, an output of the A/D converter 7 is applied to a synchronization separating circuit 8 and a jitter detection circuit 9. The synchronization separating circuit 8 detects a timing for the horizontal synchronizing signal from the applied video signal, and at which timing generates a negative synchronization separating pulse (FIG. 2 (b)). Usually a fixed delay is attendant from the time of timing detection to pulse generation. The pulse is applied to a burst flag generating circuit 10 and a fixed delay circuit 11.

The burst flag generating circuit 10 starts counting of reference clock pulses applied from the reference clock generating circuit 17 in response to the applied pulse (FIG. 2 (b)). Then, when the counted value reaches a predetermined value, the burst flag generating circuit 10 generates a burst flag pulse as shown in FIG. 2 (c) and applies the same to the jitter detection circuit 9. A rise timing and a duration of the burst flag pulse is predetermined so as to correspond to a generation period of, for example, burst waves of four periods in the middle which are obtained by eliminating the waves on both sides of, for example, burst waves of six periods constituting the burst signal.

The fixed delay circuit 11 also starts counting of the reference clock pulses applied from the reference clock generating circuit 17 in response to the applied pulse (FIG. 2 (b)). Then, when the counted value reaches a predetermined value, that is, at a timing which is after the end of the burst period and immediately before the start of a video signal period, the fixed delay circuit 11 generates the pulse as shown in FIG. 2 (d) and applies the same to a writing start control circuit 13 which will be described later.

The jitter detection circuit 9 detects sampling phases of the burst signal from levels of the output of the A/D converter 7 (i.e. burst wave) during the burst flag pulse generation period. If the fluctuation in time, that is, a phase shift occurs in the reproduced video signal, sampling point of the burst wave fluctuates at the time of A/D conversion, so that a level at each sampling point is fluctuated. Accordingly, the jitter detection circuit 9 calculates the sampling phase based on such a sampling level and outputs a mean value of sampling phases corresponding to four waves as a signal corresponding to the amount of the phase shift, that is, the jitter amount of the video signal.

Jitter occurs within the range of ± n clock when a frequency of the reference clock is $2n$ (n is a positive integer) times as large as a burst frequency. Therefore, the jitter amount detected by the jitter detection circuit 9 is within this range.

The detection data outputted from the jitter detection circuit 9 is, for example, 8 bit data, most significant three bits of which being applied to the writing start control circuit 13 for use in the correction of large jitter components (corresponding to integer number of reference clock periods), as will be described later, and leas significant 5 bits of which being applied to a clock phase modulating circuit 12 and a timing circuit 2 for use in the correction of small jitter components (corresponding to a period smaller than one period of the reference clock) as will be described later.

The clock phase modulating cirucit 12 is a circuit for modulating a phase of the reference clock supplied from the reference clock generating circuit 17. Then, the reproduced video signal supplied from the video signal reproducing circuit 200 is also applied to the A/D converter 1 wherein the signal is A/D converted in synchronization with the phase modulated clock outputted from the clock phase modulating circuit 12. On this occasion, the phase modulating circuit 12 immediately controls a phase shift amount of the reference clock so as to correct a phase shift smaller than one clock period, based on the low-order data of the detection data from the above described jitter detection circuit 9.

Then, the output of the A/D converter 1 is applied to the timing circuit 2. Briefly stated, the timing circuit detects a specific phase relation based on the detection data from the jitter detection circuit 9, thereby controlling the timing for transferring the A/D converted data, considering the fact that reliable transfer of the A/D conversion data becomes difficult when a phase relation between the above described reference clock and the phase modulated clock becomes a specific one. FIG. 3 is a block diagram showing a structure of the timing circuit 2 and FIGS. 4A and 4B are timing charts for explaining an operational principle thereof.

More specifically, the timing circuit 2 is comprised of a latch circuit 2a for latching the output (FIG. 4 (c)) of the A/D converter 1, a timing switching circuit 2b responsive to a phase modulated clock (FIG. 4(a)) from the clock phase modulating circuit 12 of FIG. 1 for subjecting the phase modulated clock to a code inversion processing and the like, based on jitter detection data from the jitter detection circuit 9, to supply a timing clock (FIG. 4(b)) to the latch circuit 2a, and a D-flip-flop 2c operating in response to a reference clock (FIG. 4(d)). In the circuit of FIG. 3, the timing switching circuit 2b usually applies the phase modulated clock directly to the latch circuit 2a as shown in FIG. 4A(a) and (b), which circuit latches the A/D converted data (FIG. 4A(c)) at the timing. For example, as shown in FIG. 4A (a), assuming that the A/D converted data (FIG. 4A (c)) is latched in the latch circuit 2a at a rise timing of the phase modulated clock and the data thereof is written in the D-Flip-flop 2c at the rise timing of the reference clock as shown in FIG. 4 (d). However, in case of the phase relation as shown in FIG. 4A, transferring to the D-flip-flop 2c is performed during the writing of the video data, so that precise data transferring can not be implemented. Therefore, in case the phase relation as shown in FIG. 4A occurs, by shifting the timing clock for writing to the latch circuit 2a by ½ period without changing the timing for A/D conversion, as shown in FIG. 4B, data transfering to the D-flip-flop 2c can be reliably performed.

Accordingly, the timing circuit 2 of FIG. 3 is structured such that the phase modulated clock is shifted by ½ period through code inversion to be applied to the latch circuit 2a in case the jitter detection data shows the specific phase relation as shown in FIG. 4A.

The output of the timing circuit 2 is delayed through a video delay circuit 3 so as to compensate the time delay attendant with the above described horizontal synchronization detection, and thereafter written into a memory 4. Writing and reading operations of the memory 4 are controlled by a writing control circuit 14 and a reading control circuit 16 respectively. Then, the timing for starting to write data in the memory 4 is defined by a write starting pulse applied from the writing start control circuit 13 to the writing control circuit 14.

Described in more detail, the writing start control circuit 13 starts counting of the reference clock pulses in response to a pulse from the fixed delay circuit 11 (FIG. 2(d)), then, when the counted value reaches the value determined by the contents of the high-order data among the detection data from the jitter detection circuit 9, generates a write starting pulse (variable delay pulse) as shown in FIG. 2 (e) and applies the same to the writing control circuit 14. Namely, the writing start control circuit 13 appropriately and variably delays a fixed delay output (FIG. 2 (d)) by the amount of time corresponding to the magnitude of the jitter at that time. As a result, the write starting pulse (FIG. 2 (e)) synchronizes with a starting point of a video signal period in every 1H period irrespective of the degree of jitter, so that only the video information in each horizontal line is written into the memory 4 under the control of the writing control circuit 14.

Subsequently, the timing for starting to read the video information for every horizontal line written in the memory 4 is defined by a read starting pulse applied from a read H generating circuit 15 to a reading start control circuit 16, so that the contents of the memory 4 is read out in synchronization with the reference clock under the control of the reading control circuit 16.

The video information read out from the memory 4 is D/A converted by a D/A converter 5 in synchronization with the reference clock and then externally outputted as a reproduced video signal through the terminal 300.

Although the prior art shown in FIG. 1 comprises two A/D converters 1 and 7, these A/D converters need not be operated simultaneously. Accordingly, one A/D converter may be provided such that a clock to be inputted is switched between the horizontal blanking period and the video signal period in order to implement the same operation as that of the prior art of FIG. 1.

FIG. 5 is a schematic block diagram showing one example of a conventional jitter compensation circuit including only one A/D converter as described above.

The prior art shown in FIG. 5 is the same as the prior art shown in FIG. 1 except for the following points. Namely, in FIG. 5, the A/D converter 7 of FIG. 1 is not provided and the reproduced video signal which is A/D converted in the A/D converter 1 and further passed through the timing circuit 2 is applied to the synchronization separating circuit 8 and the jitter detection circuit 9. The synchronization separating circuit 8, as the prior art of FIG. 1, detects a horizontal synchronization timing in the reproduced video signal and applies a pulse synchronized therewith to a clock switching circuit 18 as well as to the burst flag generating circuit 10 and the fixed delay circuit 11. Operations of the burst flag generating circuit 10 and the fixed delay circuit 11 are the same as those of FIG. 1 described above.

Furthermore, the clock commonly supplied to the A/D converter 1 and the timing circuit 2 is selected by a first switch $S_1$. Switching of the switch $S_1$ is controlled by the foregoing clock switching circuit 18. More specifically, the clock switching circuit 18 switches the switch $S_1$ to the side of a terminal b during the horizontal blanking period in response to the output of the synchronization separating circuit 8, whereby a reference clock from the reference clock generating circuit 17 is supplied to the A/D converting circuit 1 and the timing circuit 2. In addition, a switch $S_2$ which is switched linking with the switch $S_1$ is further provided, and whcih switch $S_2$ is also switched to the side of the termianl b during the horizontal blanking period, thereby interrupting the supply of the jitter compensation data to the timing circuit 2.

In this way, during the horizontal blanking period, the reproduced video signal which is A/D converted by the reference clock is applied to the jitter detection circuit 9 through the timing circuit 2, then the jitter detection circuit 9 generates jitter detection data based on a mean value of the sampling phase of the burst in the burst flag pulse generation period, as the embodiment of FIG. 1. Then, the writing start control circuit 13 defines a timing for starting to write of he video information to the memory 4, based on the high-order data of the jitter detection data, and the phase clock modulating circuit 12 determines a shift amount of the phase modulated clock, based on the low-order data thereof.

When the horizontal blanking period ends and the video signal (C and Y) period starts, both of the switches $S_1$ and $S_2$ are switched to the terminal a side by a signal from the clock switching circuit 18. As a result, a phase modulated clock is supplied from the clock phase modulating circuit 12 through the switch $S_1$ to both of the A/D converter 1 and the timing circuit 2, and furthermore the low-order data of the jitter detection data is supplied from the jitter detection circuit 9 through the switch $S_2$ to the timing circuit 2.

More specifically, in the prior art of FIG. 5, during the horizontal blanking period, a jitter amount is detected based on the reference clock, and during the video signal period, the reproduced video signal is A/D converted in synchronization with the clock corrected based on the amount of jitter and the A/D converted data is written into the memory 4 at a timing defined based on the amount of jitter.

However, the prior art shown in FIG. 5 requires the switches $S_1$ and $S_2$ to be switched without fail before and after the horizontal blanking period, which might prevent a precise jitter compensation. For example, due to a switching from the phase modulated clock to the reference clock by the switch $S_1$ immediately before the horizontal blanking period, a timing for sampling by the A/D converter 1 is changed, which might prevent a precise detection of a horizontal synchronization timing in the synchronization separating circuit 8. Such a failure of the detection of the horizontal synchronization timing might prevents a burst period from being determined and the jitter amount from being detected, which makes a precise jitter compensation impossible. In addition, there exist possibility that the video information to be written into memory 4 might be affected due to switching from the referene clock to the phase modulated clock by the switch $S_1$ at the timing of switching from the horizontal blanking period to the video signal period.

SUMMARY OF THE INVENTION

Therefore an object of the present invention is to provide a jitter compensation circuit capable of precisely and stably correct jitter components included in a reproduced video signal.

Another object of the present invention is to provide a jitter compensation circuit in which at the same time a single A/D converter can detect the amount of jitter without providing switching means.

Briefly stated, a jitter compensation circuit according to the present invention A/D converts a reproduced video signal in synchronization with a phase modulated clock, detects a sampling phase of a burst based on an A/D conversion value of the burst signal in the reproduced video signal, detects the amount of jitter in the reproduced video signal to obtain jitter compensation data. The latest jitter compensation data is calculated based on the latest detected jitter amount and the jitter compensation data one horizontal period before the latest. The timing for starting to write the A/D conversion value of the video signal into the memory is defined so as to cancel the jitter components based on the obtained jitter compensation data and a phase of the phase modulated clock for A/D conversion is controlled.

Accordingly, a principal advantage of the present invention is that a reproduced video signal is always A/D converted only by a phase modulated clock without providing switching means, so that stable and precise jitter compensation of the reproduced video signal can be implemented by a single A/D converter.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a block diagram showing a structure of a timing circuit included in the jitter compensation circuit shown in FIG. 1.

FIGS. 4A and 4B are timing charts for explaining an operation of the timing circuit shown in FIG. 3.

FIG. 11 is a timing chart for explaining an operation of the embodiment shown in FIG. 8.

DESCRIPTON OF THE PREFERRED EMBODIMENTS

Figure 1:
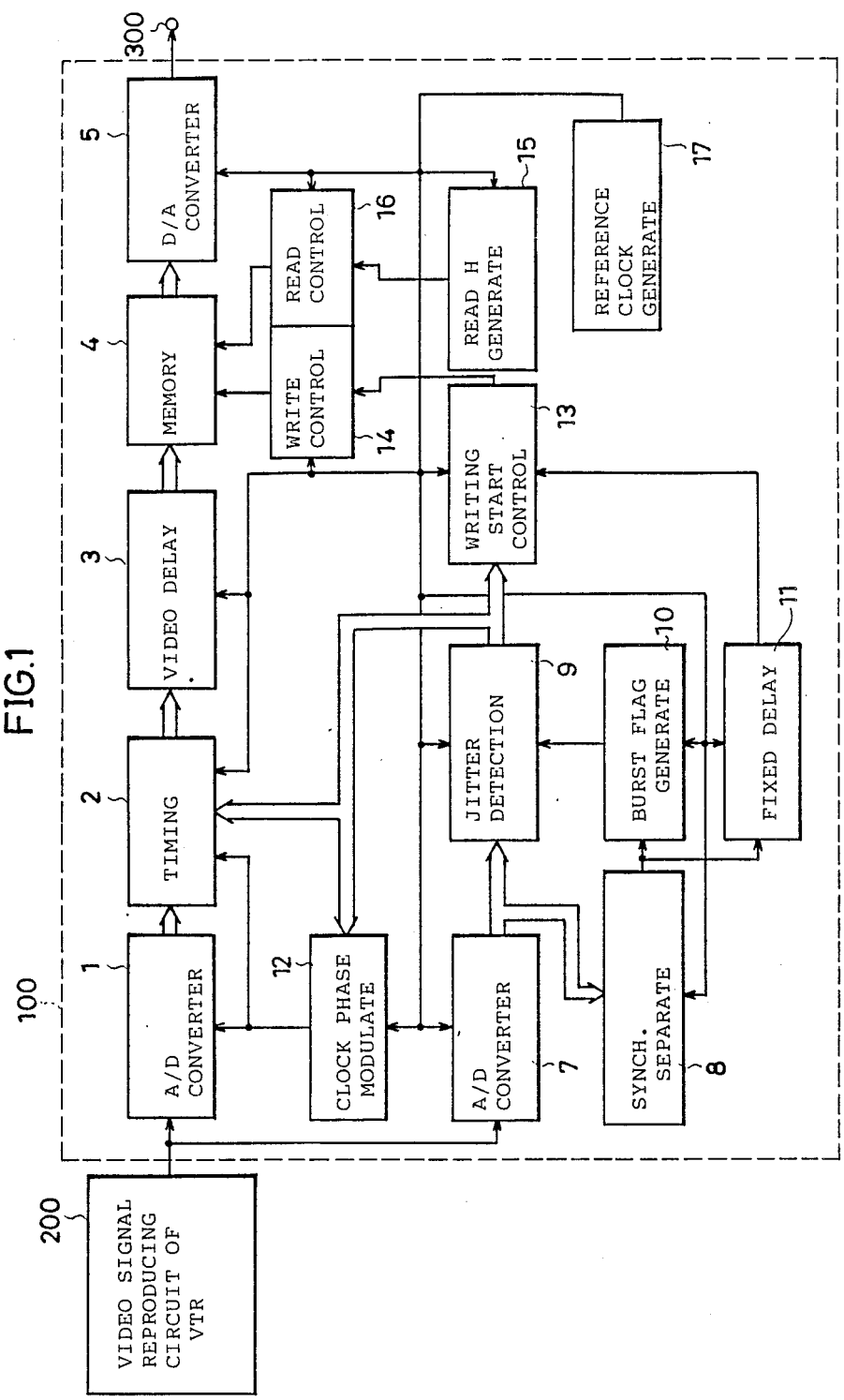
FIG. 1 is a schematic block diagram showing one example of a conventional jitter compensation circuit.
Figure 2:
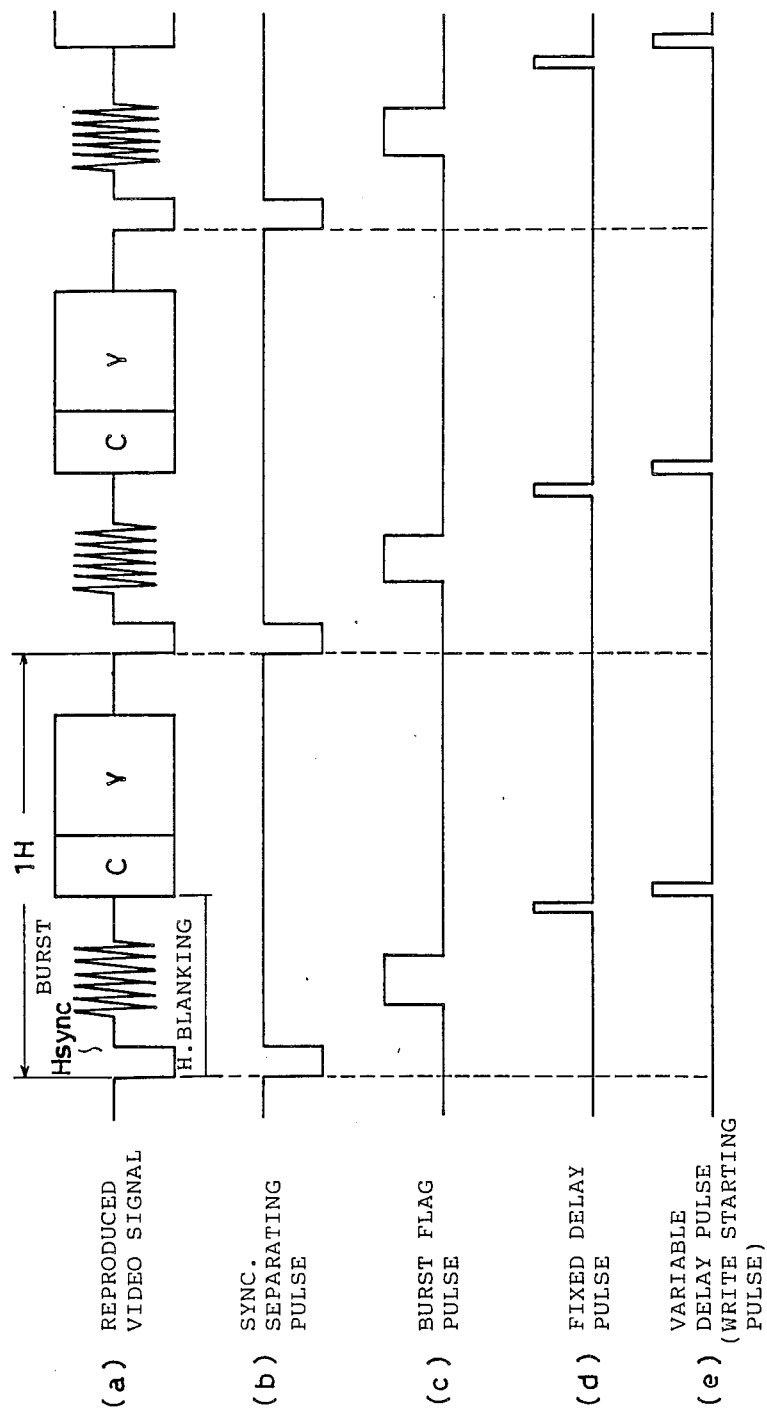
FIG. 2 is a timing chart for explaining an operation of the jitter compensation circuit shown in FIG. 1.
Figure 6:
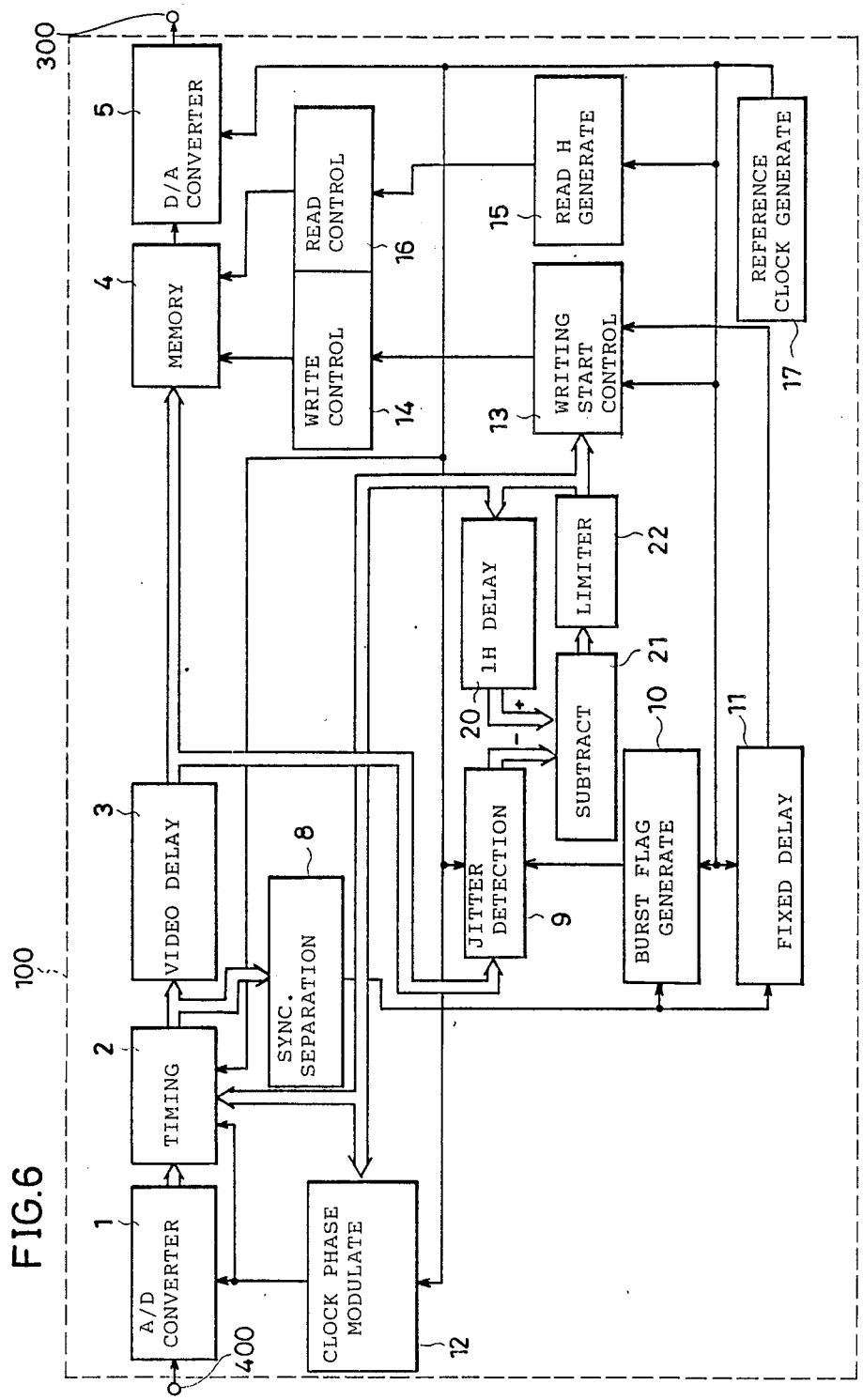
FIG. 6 is a schematic block diagram showing a jitter compensation circuit according to a first embodiment of the present invention.

FIG. 6 is a schematic block diagram showing a jitter compensation circuit for a VTR according to a first embodiment of the present invention. In FIG. 6, a jitter compensation circuit 100, as the prior art shown in FIG. 1, receives a reproduced video signal from a video signal reproducing circuit 200 of VTR (not shown in FIG. 6) through a terminal 400, subjects the same to the jitter compensation and externally outputs the jitter corrected reproduced video signal as a reproduced video signal of VTR through an ouputut terminal 300. In the following embodiments, it is assumed that a frequency of a burst signal included in a reproduced video signal is selected to be multiple of one sixth of a reference clock.

Figure 5:
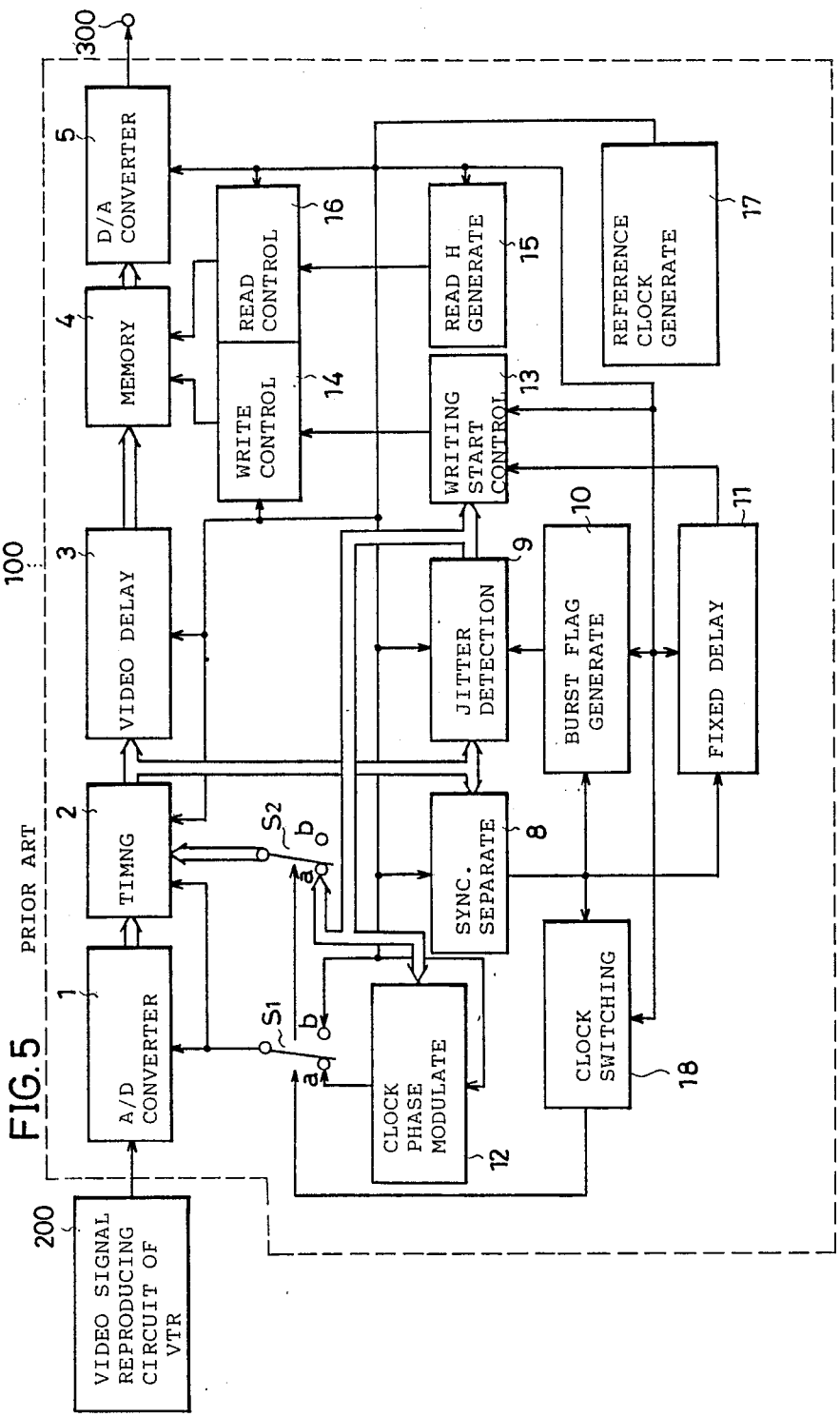
FIG. 5 is a schematic block diagram showing another example of a conventional jitter compensation circuit.

The embodiment shown in FIG. 6 is the same as the prior art shown in FIG. 5 except for the following points. Namely, in the embodiment of FIG. 6, the clock switching circuit 18 and the switched $S_1$ and $S_2$ of FIG. 5 are not provided, and the A/D converter 1 always performs A/D conversion in synchronization with a phase modulated clock from the clock phase modulating circuit 12 and an A/D converted output is applied to the timing circuit 2 which is always in an operating state. The A/D converted data outputted from the timing circuit 2 in synchronization with a reference clock is applied to the video delay circuit 3 and the synchronization separating circuit 8 to detect a horizontal sychronization timing. The output of the timing circuit 2 is not applied to the jitter detection circuit as shown in FIG. 5. The output of the synchronization separating circuit 8 is applied to the burst flag generating circuit 10 and the fixed delay circuit 11, and which circuits generate a burst flag pulse and a fixed delay pulse respectively.

The A/D converted video data delayed by the video delay circuit 3 is written in the memory 4 and at the same time inputted to the jitter detection circuit 9, and which circuit detects an A/D converted data during a burst flag pulse generation period, that is, a sampling phase of a burst signal and outputs the same as a jitter amount with respect to the phase modulated clock at that time.

Thus, detected data is applied to a negative input of a substracting circuit 21 in order to detect jitter compensation data. The jitter compensation data 1H before which is stored in the 1H delay circuit 20 is inputted to a positive input of the subtracting circuit 21. The subtracting circuit 21 subtracts the jitter detection data from the jitter compensation data 1H before to calculate the amount of jitter compensation. Namely, according to the present embodiment, the latest jitter amount detected based on a phase modulated clock whose phase is corrected one horizontal period before corresponds to the amount of jitter fluctuation, and therefore the amount of jitter to be corrected can be calculated by subtracting the latest jitter amount from the jitter compensation data one horizontal period before. The amount of jitter compensation is held within a range of a predetermined value through a limiter 22. Although the predetermined range is set to be narrower than the response range of the writing start control circuit 13, when the response range is wide enough, the limiter 22 can be omitted. The data outputted from the limiter 22 is applied as jitter compensation data to the writing start control circuit 13, the clock phase modulating circuit 12 and the timing circuit 2, and also stored in the 1H delay circuit 20 as described above.

The clock phase modulating circuit 12 detects the low-order data for correcting the jitter smaller than one clock period among the applied jitter compensation data and in response thereto, appropriately changes the amount of phase shift of a reference clock to correct small jitter components. The timing circuit 2 judges a phase relation between the phase modulated clock and the reference clock based on the low-order jitter compensation data to adjust a timing when necessary.

Furthermore, the writing start control circuit 13 determines a count number of the reference clock based on the high order data among the applied jitter compensation data, and when the counted value of the reference clock pulse reaches this value, the circuit generates a variable delay pulse, that is, a write starting pulse and applies the same to the writing control circuit 14. The writing control circuit 14 receives the write starting pulse to write the A/D converted data into the memory 4 on a line basis. This causes the write starting pulse to coincide with a starting point of a video signal period irrespective of the degree of the jitter, so that only the video information of each horizontal line is written into the memory 4.

The video data is written into the memory 4 in synchronization with the horizontal synchronizing signal in the reproduced video signal, and meanwhile the data is read out in a fixed period. A read H generating circuit 15 generates a read starting pulse every horizontal period and apply the same to a read control circuit 16, and which circuit responding thereto reads the A/D converted data from the memory 4 for every horizontal line. Thus read video data no longer includes jitter components, and it is further D/A converted in the D/A converted 5 to be externally outputted through the terminal 300.

Although not shown in FIG. 6, in case a line sequential color signal (C) and a luminance signal (Y) in the A/D converted data are time bases expanded to be original ones and synchronized with each other and thereafter subjected to various digital processings, such a processing circuit should be provided in a prior stage of the A/D converter 5.

Detection of the horizontal synchronization timing by the synchronization separating circuit 8 is generally attended with dealy as described above, so that the jitter amount can not be detected precisely if a bust signal inputted to the jitter detection circuit 9 is not delayed by the corresponding amount. The first embodiment shown in FIG. 6 takes advantage of the delay of the video data by the video delay circuit 3 provided for the purpose of time base correction and the like in order to compensate such delay, that is, the delay of generation of the synchronization separating pulse by the synchronization separating circuit 8. However, in case the delay time of the video delay circuit 3 is not sufficiently long, a burst flag pulse is generated by the burst flag generating circuit 10 later, whereby the jitter amount can not be detected precisely in the long run.

Figure 7:
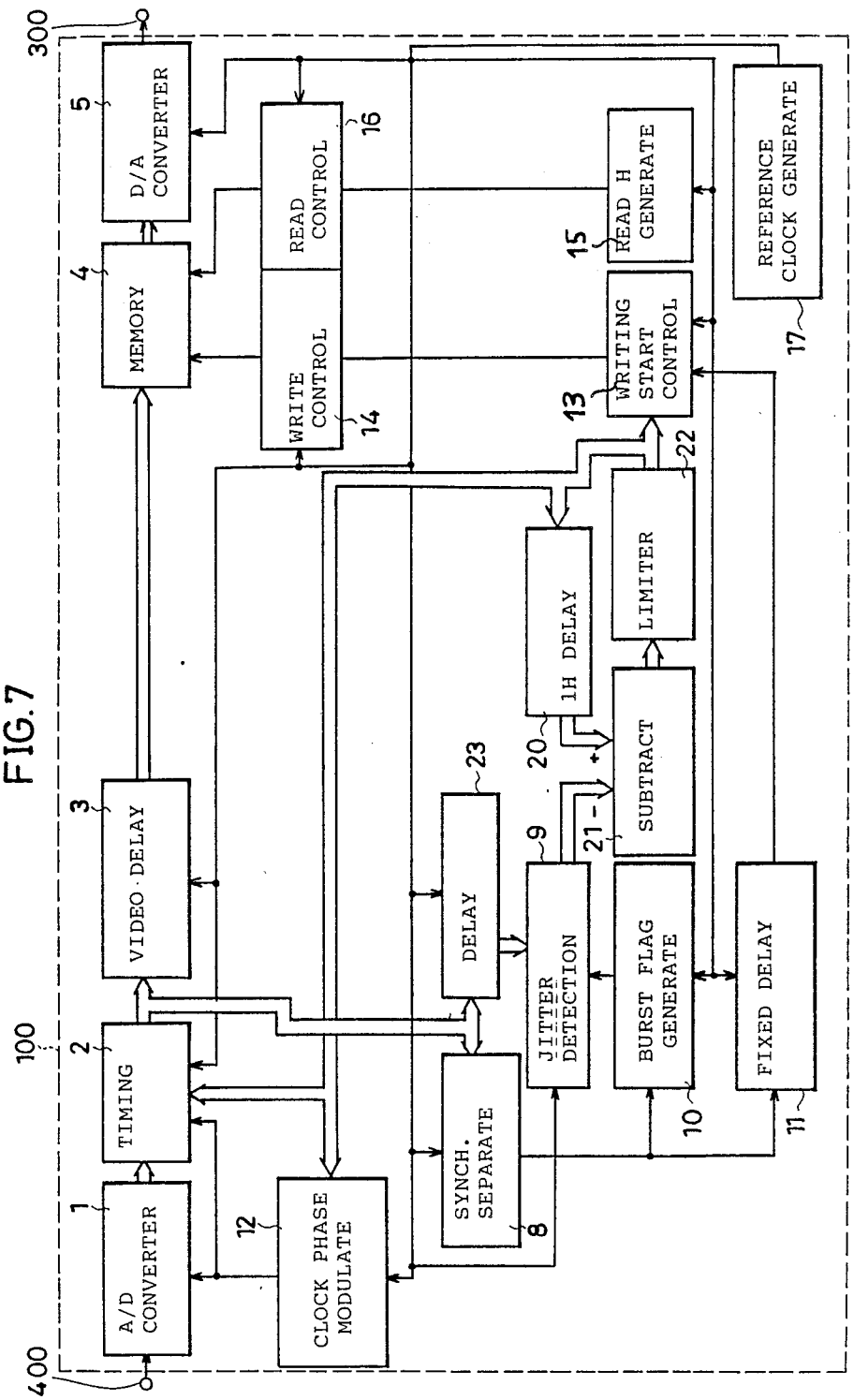
FIG. 7 is a schematic block diagram showing a jitter compensation circuit according to a second embodiment of the present invention.

FIG. 7 is a schematic block diagram showing a jitter compensation circuit according to a second embodiment of the present invention direction to solving the above described problems. According to the embodiment of FIG. 7, since the output of the timing circuit 2 is to be delayed by a dedicated delay circuit 23 provided separately, the video data can be delayed in accordance with the actual delay time of the synchronization separating circuit 8, thereby enabling a precise detection of the jitter. The embodiment shown in FIG. 7 is the same as the embodiment of FIG. 6 in other repects, and no further description will be given.

On the other hand, the above described first and second embodiments are for adjusting phase shift in a starting portion of each horizontal line, that is, for detecting phase shift during a horizontal line, that is, for detecting phase shift during a horizontal blanking period to compensate the shift at the beginning of a video signal period, which are not capable of processing the jitter due to fluctuation in time during the video signal period.

Figure 8:
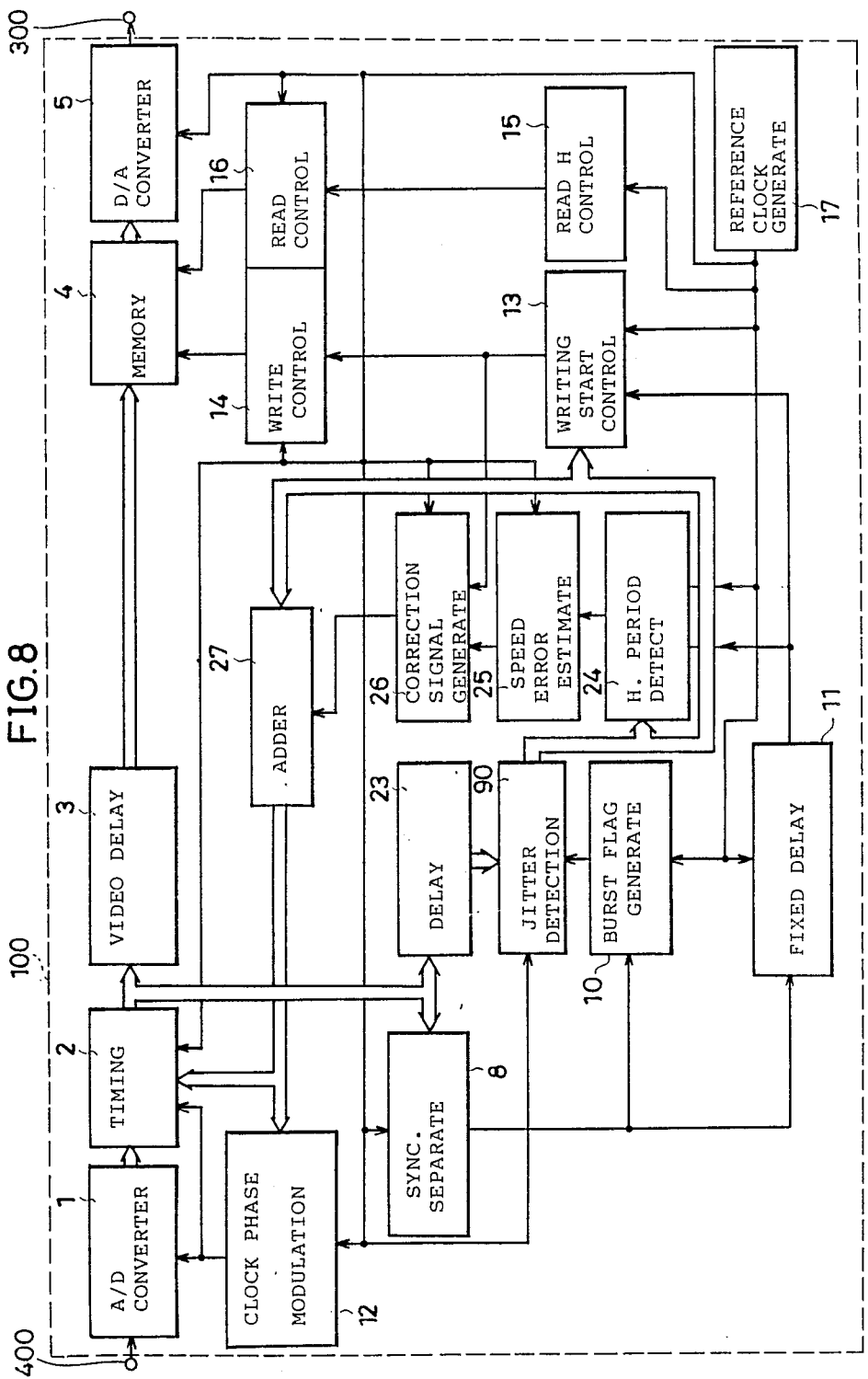
FIG. 8 is a schematic block diagram showing a jitter compensation circuit according to a third embodiment of the present invention.

FIG. 8 is a schematic block diagram showing a jitter compensation circuit according to a third embodiment of the present invention directed to solving such a problem. The embodiment shown in FIG. 8 is the same as that shown in FIG. 7 except the following points. Namely, the embodiment of FIG. 8 estimates jitter fluctuation during a video signal period and corresponding thereto successively changes a phase of a clock during the video signal period.

Described in more detail, in the embodiment of FIG. 8, a jitter detection circuit 90 includes the 1H delay circuit 20, the subtracting circuit 21 and the limiter 22 of FIG. 7, and in addition, this embodiment comprises a horizontal period detection circuit 24, a speed error estimating circuit 25, a correction signal generating circuit 26 and an adder circuit 27. The horizontal period detection circuit 24 is a circuit for precisely detecting a horizontal period to output horizontal period data, and comprises means for roughly calculating a horizontal period, means for minutely calculating the amount of fluctuation of the horizontal period and means for computing both thereof.

Figure 9:
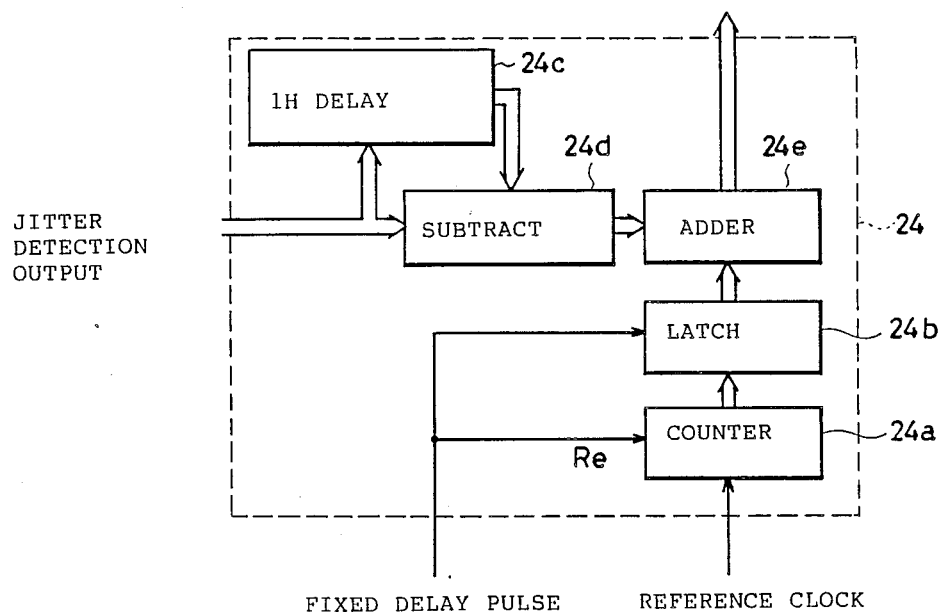
FIG. 9 is a block diagram showing a horizontal period detection circuit included in the embodiment of FIG. 8.

FIG. 9 is a block diagram showing in detail the horizontal period detection circuit 24. First a rough calculation of the horizontal period will be described. At a time point delayed by the amount of integral number of reference clocks from a synchronization separating pulse generated from the synchronization separating circuit 8, that is, near an end point of a horizontal blanking period, the fixed delay circuit 11 generates a fixed delay pulse and applied the same to a reset input of a counter 24a and a latch input of a latch circuit 24a in the horizontal period detection circuit 24. The counter 24a counts a reference clock and is reset for each line by the fixed delay pulse, whereby the counted value is latched in the latch circuit 24b in a timing of the reset. Namely, however the data latched in the latch circuit 24b approximately corresponds to the horizontal period, the data still has time delay. Assuming that in the embodiment of FIG. 8, during the horizontal synchronization signal period of the reproduced video signal, a clock modulation state of the clock phase modulating circuit 12 is fixed in a specific modulation state and A/D conversion of the reproduced video signal by the A/D converter 1 is performed at a timing of a phase fixed with respect to the reference clock phase.

Now, fine calculation of the horizontal period will be described. The jitter detection circuit 90 of FIG. 8, as the embodiment of FIG. 7, detects jitter compensation data based on a burst signal level corresponding to the amount of phase shift during a burst flag pulse generation period and applies the same to a 1H delay circuit 24c and a subtracting circuit 24d in the horizontal period detection circuit. Since the burst signal period is set to be the multiple of 6 of the reference clock period as described above, a range of the phase shift amount detected by the jitter detection circuit 90 is within a range of ±3 clocks, and the preciseness of the detection is 1/32 of one clock. Accordingly, the jitter detecting output is within the range of ±3 clock and can be detected with the preciseness of 5 bits with respect to decimal point less than one clock.

The subtracting circuit 24d subtracts the jitter compensation data 1H before stored in the 1H delay circuit 24c from the applied jitter compensation data to calculate the amount of a fine fluctuation of the horizontal periods. The adder circuit 24e adds the rough horizontal period data from the latch circuit 24b and the fine fluctuation amount from the subtracting circuit 24d, thereby calculating a horizontal period of high preciseness and applying the same to the speed error estimating circuit 25.

The speed error estimating circuit 25 performs a calculation of a known $T_n = 3T_{n-1} - 3T_{n-2} + T_{n-3}$ based on the horizontal periods $T_{n-1}$, $T_{n-2}$ and $T_{n-3}$ which are of the period 1H before, 2H before and 3H before respectively to estimate a horizontal period $T_n$ in the line. Then, the speed error estimating circuit 25 subtracts a horizontal period $T_0$ as a reference from thus estimated horizontal period $T_n$ to calculate a speed error estimating data $\Delta T_n$ and applies the same to the correction signal generating circuit 26.

Figure 10:
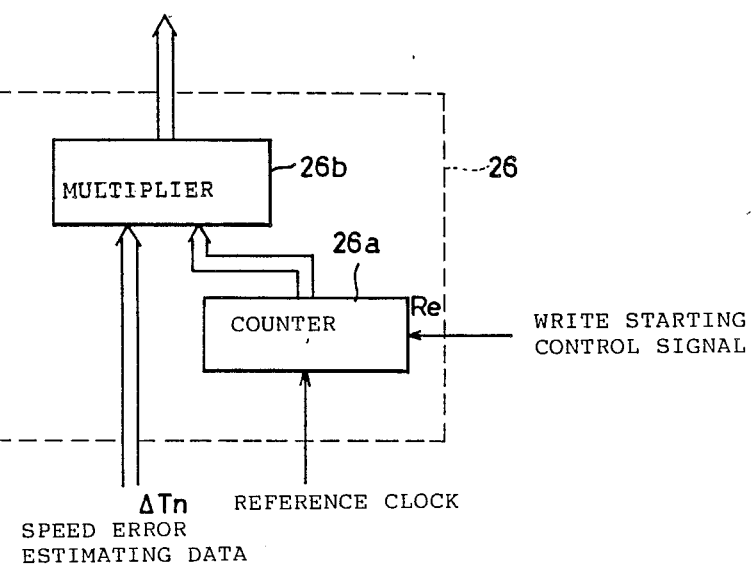
FIG. 10 is a block diagram showing a correction signal generating circuit included in the embodiment of FIG. 8.

FIG. 10 is a block diagram showing in detail the correction signal generating circuit 26. The correction signal generating circuit 26 includes a counter 26a for counting a reference clock and is reset by a write starting pulse. A value of the counter 26a is applied to one input of a multiplier circuit 26b. The speed error estimating data $\Delta T_n$ is aplied to the other input of the multiplier circuit 26b from the speed error estimating circuit 25, so that the multiplier circuit 26b multiplies the data $\Delta T_n$, the output of the counter 26a and a predetermined coefficient to supply multiplied output which is successively increased or decreased from 0 to the value of the data $\Delta T_n$ during each video signal period as a correction signal. FIG. 11 is a timing chart showing a relation between the applied reproduced video signal (a) and such a correction signal (b).

The adder circuit 27 adds the low order data regarding the jitter compensation smaller than one clock among the jitter compensaiton data from the jitter detection circuit 90 and the correction signal from the correction signal generating circuit 26, which is supplied to the clock phase modulating circuit 12 and the timing circuit 2. The clock phase modulating circuit 12 is in a fixed modulation state until the generation of the jitter compensation data and after the generation of the jitter compensation data it defines a modulated clock phase at a starting point of the video signal period, and furthermore during the video signal period it changes the phase thereof in proportion to the speed error estimating data $\Delta T_n$. Meanwhile, in this embodiment, phase modulating steps of the clock phase modulating circuit 12 are supposed to be comprised of 16 stages.

As the foregoing, according to the third embodiment of the present invention, a phase of the phase modulated clock is successively changed during the video signal period of each horizontal line, so that the jitter occurring during the video signal period can be processed.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A jitter compensation circuit for processing jitter components of a reproduced video signal, comprising:
   means (400) for supplying said reproduced video signal including at least a horizontal synchronizing signal component, a bust signal component and a video signal component in one horizontal period, clock phase modulating means (12) for supplying a phase modulated clock, A/D converting means (1) for convering said reproduced video signal into a digital signal in sychronization with said phase modulated clock, jitter detecting means (10, 9) for generating jitter detection data for every horizontal period based on a digital value of said burst signal component by said A/D converting means, compensation data generating means (20, 21) for generating jitter compensaton data in every horizontal period based on said jitter detection data, said compensation data generating means generating the latest jitter compensation data based on said jitter detection data and said jitter compensaton data one horizontal period before, memory (4) for temporarily storing a digital value of said video signal component by said A/D converting means, means (14, 15, 16) for writing and reading said digital value of the video signal component to and from said memory, and means for defining a timing for starting to write said digital value of the video signal component to siad memory so as to cancel said jitter components based on said jitter compensation data, said clock phase modulating means controlling a phase of said phase modulated clock so as to cancel said jitter components based on said jitter compensation data.

2. A jitter compensation circuit according to claim 1, further comprising means (17) for generating a reference clock, wherein said clock phase modulating means modulates the phase of said reference clock and supplies the phase modulated clock.

3. A jitter compensation circuit according to claim 2, further comprising means (2) for detecting a specific phase relation between said reference clock and said phase 000ulated clock, based on said jitter compensation data to adjust a timing for transfer of an output of said A/D coverting means.

4. A jitter compensation circuit according to claim 1, further comprising synchronization separating means (8) for detecting a timing of said horizontal sychronizing signal component from the output of said A/D converting means, wherein said jitter detecting means comprises:

means (10) for specifying a generation period of said burst signal component based on said detected timing of the horizontal synchronizing signal component, means (9) for obtaining a mean value of sampling phases of the burst waves during said generating period of the burst signal component.

5. A jitter compensation circuit according to claim 4, wherein said writing start timing defining means comprises, means (11) for generating a signal delayed by a fixed time period from said detected timing of the horizontal synchronizing signal, means (13) responsive to said jitter compensation data for variably delaying said fixed time delayed signal to generate a write starting pulse to be applied to said memory writing means.

6. A jitter compensation circuit according to claim 1, wherein, said compensation data generating means comprises, means (20) for storing said jitter compensation data one horizontal period before, means (21) for subtracting a latest jitter detection data.

7. A jitter compensation circuit according to claim 6, wherein said compensation data generating means comprises a limiter (22) for receiving an output of said subtracting means.

8. A jitter compensation circuit according to claim 1, further comprising:

means (24, 25, 26) for estimating jitter components in said video signal component period to generate a correction signal, means (27) for adding said jitter compensation data and said correction signal to supply the result of addition to said clock phase modulated means.

9. A jitter compensation circuit according to claim 8, wherein said correction signal generating means comprises, horizontal period detecting means (24) for detecting a horizontal period of said reproduced video signal based on said jitter compensation data, means (25) for estimating an error of the latest horizontal period based on a plurality of horizontal periods detected by said horizontal period detecting means, means (26) for generating said correction signal which is successivley changed during the video signal component period bsed on said estimated horizontal period error.

* * * * *